United States Patent [19]

Lugay et al.

[11] 4,031,259

[45] June 21, 1977

[54] PROCESS OF PREPARING NUTRITIVE SWEETENING COMPOSITIONS

[75] Inventors: Joaquin Castro Lugay, Thornwood; Jacob Richard Feldman, New City, both of N.Y.

[73] Assignee: General Foods Corporation, White Plains, N.Y.

[22] Filed: Aug. 13, 1975

[21] Appl. No.: 604,289

[52] U.S. Cl. .............................. 426/548; 426/656; 426/657; 426/804
[51] Int. Cl.² ........................................ A23L 1/236
[58] Field of Search .......... 426/548, 656, 657, 804, 426/385, 471

[56] References Cited

UNITED STATES PATENTS

| | | |
|---|---|---|
| 3,753,739 | 8/1973 | Cella et al. ..................... 426/548 |
| 3,761,288 | 9/1973 | Glicksman et al. ................ 426/548 |
| 3,798,204 | 3/1974 | Nakajima et al. ................ 426/548 |
| 3,928,633 | 12/1975 | Shoaf et al. .................. 426/548 X |

*Primary Examiner*—Raymond N. Jones
*Assistant Examiner*—Esther L. Massung
*Attorney, Agent, or Firm*—Thaddius J. Carvis; Bruno P. Struzzi; Daniel J. Donovan

[57] ABSTRACT

A novel sweetening composition which is low in calories, stable, highly nutritious, and readily soluble is obtained by co-drying a low molecular weight polypeptides with a dipeptide sweetener.

9 Claims, No Drawings

PROCESS OF PREPARING NUTRITIVE SWEETENING COMPOSITIONS

BACKGROUND OF THE INVENTION

This invention relates to novel sweetening compositions having superior solubility and stability as well as enhanced nutritive properties. Specifically, it relates to a high protein, low calorie, bulked sweetener comprised of a dipeptide sweetener(s), a soluble salt of a dipeptide sweetener or combinations thereof co-dried with a low molecular weight polypeptide such that the resultant dry bulked composition is sweet.

In the low calorie sweetener art, it is known that amino acid-containing nutritive sweeteners for example, dipeptide sweeteners such as lower alkyl esters of L-aspartyl-L-phenylalanine, e.g. L-aspartyl-L-phenylalanine methyl ester hereinafter referred to as APM and L-aspartic acid derivative sweeteners are as much as 200 times as sweet as sucrose. However, several factors which impede the ease of employing these compounds as food sweeteners are both their poor rate of solubility in aqueous environments and the fact that conventional bulking agents often impart an off flavor and in some instances contribute significantly to the overall caloric content. This is not to mention the most significant fact that these bulking agents contribute little, if any, nutritional benefit to the final bulked product.

The difficulty encountered in past attempts to enhance the solubility of these compounds arose due to the inability to procure bland materials which would not diminish the sweet taste and yet which possessed sufficient water solubility over a wide range of pH and temperature conditions, i.e. as in desserts, coffee and beverages.

A recent trend has been established in employing dextrins as the preferred bulking agents for these sweeteners as seen in U.S. Pat. Nos. 3,761,288 issued Sept. 25, 1973 and 3,753,739 issued Aug. 21, 1973. While the advantages of employing such dextrins are apparent in terms of obtaining dipeptide sweeteners of improved solubility, dextrins and polysaccharides in general, while having virtually the same caloric content as proteins and their hydrolysates, have no nutritive value and consequently detract from the advantages of imbibing low calorie sweeteners.

SUMMARY OF THE INVENTION

In accordance with the present invention a primary object is to provide a totally new product form for amino acid-derived nutritive sweeteners wherein the product is more soluble and stable than the sweetener alone and is a product of enhanced nutritive value. More specifically, this invention furnishes the consumer with a broad spectrum amino acid-containing low calorie sweetener never before appreciated in the prior art. The advantages of employing the low molecular weight polypeptides over conventional bulking agents are two fold: (1) the bulked sweetener provides the consumer with a sweetener which is not only low in calories but is highly nutritious, making the same sweetener especially useful for individuals who are calorie-wise but nutrition foolish; and (2) as the total concentration of sweetener increases the amount of polypeptide necessarily co-dried therewith in order to improve the solubility and rate of solubility over the same concentration of sweetener alone decreases. This is contra to what is normally required in the case of typical, known bulking agents such as starch hydrolysates, dextrins, modified polydextroses, and the like where the concentration of bulking agent required for an increase in solubility is directly proportional to the amount of poorly soluble material present.

In accordance with its more general precepts the invention involves co-drying an amino acid-derived nutritive sweetener with a low molecular weight (i.e. such that it is water soluble) polypeptide in an aqueous solution, the amount of sweetener present and the molecular weight of the polypeptide being such that both are completely soluble in the same.

The polypeptides which may be employed throughout this invention must be nutritious, bland and soluble at a wide range of pH; they must be heat-stable to allow for a maximum range of applications as for example, in desserts, as well as hot and cold beverages. Examplary of such polypeptides are the acid hydrolyzed and enzymatically hydrolyzed protein hydrolysates. While during acid hydrolysis of the protein most of the amino acids are stable, trytophan is completely destroyed and there is danger of partial destruction of cysteine, serine and threonine. Since this has an adverse affect on the nutritive quality of the resultant hydrolysate due to the degradation of the specific amino acids, enzymatically hydrolysed protein hydrolysates by either neutral or alkaline methods are the preferred bulking agents of the immediate invention.

The protein source may be derived from animal or vegetable matter or combinations thereof, the respective benefits being that the animal source provides better nutritional qualities while the vegetable source provides acceptable nutritional qualities at more favorable cost. In any event, proteinaceous materials will be understood in the context of this invention to contemplate non-gelatin water soluble proteinaceous materials derived from both animal and vegetable origins. The proteinaceous materials contemplated by this invention do not include gelatin due to the incomplete compliment of amino acids of gelatin and its consequent inability to contribute to the broad spectrum of amino acids contained in the novel fortified sweetener of this invention. Exemplary of protein sources which may be employed are fish protein, soy protein, wheat, corn, egg protein, milk protein, plant protein and mixtures thereof.

It is believed to be an important and essential aspect of the present invention that the blend ingredients i.e. the sweetener and low molecular weight polypeptide be completely soluble in solution such that the solution to be dried is clear. Generally, this means the polypeptide will have a molecular weight not appreciably in excess of about 10,000. While the solubility rate of the resultant composition is as much as 20 fold over the sweetener alone, where an even greater rate of solubility is desired, a non-toxic soluble salt of the sweetener may be employed either alone or in combination with the unmodified sweetener. This salt may be added to the bulking agent or may be formed in situ by acidifying the sweetener/polypeptide mixture.

It is theorized that the significant improvement in the rate of solubility of the subject sweeteners is due at least in part to the interactions of the hydrophobic characters of the sweeteners with the hydrophobic regions of the polypeptide (leucine, alanine, phenylalanine etc.). In addition, ionic interactions involving the carboxy and amino groups of the sweetener and the same groups on the polypeptide possibly take place.

The relative amount of the sweetener by weight of the low molecular weight polypeptide matrix will vary depending upon the ultimate use and it will be optional therefore. As a guideline, the lower limits of sweetener when present as the sole sweetening agent would be that amount effective to impart a sweet taste to the resultant bulked sweetening composition when commingled therewith. As a guideline to the upper limit of the same, the sweetener will not be present in so great an amount as to be insoluble in solution prior to being co-dried with the polypeptide. Conversely, the lower limits of polypeptide to be employed will be that amount effective to increase the rate of solubility of the dipeptide and the stability thereof when the latter has been do-dried with the matrix. As a guideline to the upper limit of the polypeptide to be employed, the same should not be present in so great an amount as to impart an off-flavor to the resultant dry composition or to the foodstuff into which the latter is incorporated. Surprisingly, the best results in terms of increase in solubility of the sweetener over an identical concentration of sweetener not having been co-dried with a polypeptide are obtained where the ratio of polypeptide decreases in relation to the amount of dipeptide sweetener, in all instances the former being present from equimolar to major amounts. As stated previously, this is contrary to what one might expect where bulking agents are employed primarily to improve the solubility of poorly soluble materials. In the immediate invention, the dry sweetening composition will contain from about 1:1 to about 1:100 parts by weight of sweetener to polypeptide, preferably 1:1 to about 1:20, and most preferably, about 1:1 to about 1:10, 1:4 considered optimum in terms of the most advantageous affect on the solubility of the co-dried sweetener as against the sweetener alone. This is most commonly expressed as the Solubility Factor (SF) which is the time required for the pure sweetener to dissolve divided by the time required for the sweetener/polypeptide co-dried mixture to dissolve, the higher the SF, the more appreciable the improvement in solubility.

The method of drying to be employed may be any of those methods known in the art to effect a decrease in moisture content such as freeze drying, spray drying, vacuum drum drying, drum drying, air drying and the like. While freeze drying is preferred for obtention of the most rapidly soluble composition, the freeze-dried product is extremely low in density and difficult to work with. Spray drying and drum drying on the other hand produce a dried composition most like sucrose in terms of density and appearance and consequently, are preferred for this reason. However, where the aforementioned methods are employed rather than air drying or freeze-drying, it is desirable to control the amount of heat energy input so as to avoid decomposition of the sweetener, the amount of heat exposure being minimized so as to avoid degradation of these sweeteners which are heat sensitive and reactive. Preferably, the matrix should not appreciably exceed 250° F, although in some applications depending upon the relative amounts of moisture present some temperature elevation not appreciably above 300° F may be practiced provided the duration of heat treatment is reduced. Advantageously, a drum drying facility limits the amount of heat energy input to a point whereat the matrix may be safely warmed to a temperature of less then 250° F.

While air drying poses the least problems in terms of sweetness loss due to heat degradation, this method does not allow for the control of density during the drying process not to speak of the time involved. Thus, methods known to those skilled in the art such as micropulverization to a specific particle size may be employed where a specific density and particle size is desired.

While the novel dry composition of this invention neither depends upon the method of drying, the particle size of the dried product, the method of hydrolyzing the protein or the presence of added ingredients, many modifications and variations of the present invention will become apparent to those skilled in the art upon reading this disclosure. It is intended that all such modifications and variations be included within the scope of the present invention which is an amino acid-containing nutritive sweetener fixed in a water soluble, low molecular weight polypeptide such that the resultant composition is more rapidly soluble, and more stable than the sweetener alone while at the same time, providing a low calorie highly nutritious substance having a broad amino acid spectrum.

While reference has heretofore been made solely to the use of amino acid-containing nutritive sweeteners, it is contemplated within this invention that the sweetening compositions may be sweetened only in part by such nutritive sweeteners and that the same may be combined with other nutritive and/or non-nutritive sweeteners such as sugars, saccharin, cyclamate, their soluble salts and mixtures thereof. It is also contemplated within the confines of this invention that the nutritive sweeteners may be present in the bulked composition together with non-nutritive sweeteners at concentrations below their threshold level of sweetness, but whereat they are still able to contribute to the overall nutritive character of the final dry product.

Similarly, bulking agents other than the completely soluble low molecular weight polypeptides such as low dextrose equivalent starch polymers having dextrose equivalents (D.E.) of 5-20, polysaccharides such as polyglucose, polymaltose and the polymaltodextrins, food acidulents such as citric acid, malic acid, fumaric acid, lactic, adipic, sugars such as sucrose, fructose and the like may be employed in part therewith where a partially nutritive and in some instances, higher calorie, bulked sweetener is desired, as long as the polypeptide is present in an amount effective to accomplish the desired result; namely, improve the solublility of the nutritive sweetener present, while at the same time, contributing to the overall nutritive content of the composition such that a dry highly nutritive bulked sweetening composition having a broad spectrum of amino acids is derived.

However, being that the most advantageous characteristics of this invention are 1)that the solubility of the nutritive sweeteners can be improved by employing a matrix which is totally nutritive; 2) that these matrices improve the rate of solubility of these sweeteners at least 5 fold and preferably 10 fold and more over the same sweeteners alone while necessarily being present in only equimolar amounts relative to the nutritive sweetener concentration; and 3) that the appropriate matrices provide different amino acids than are contained in the subject nutritive sweeteners resulting in bulked sweetening compositions having not only improved stability and solubility, but which are highly nutritious by virtue of both their overall amino acid content as well as the broad spectrum of the same.

DESCRIPTION OF THE INVENTION

The invention will now be described by reference to the following operative preferred embodiment of the invention.

NEUTRAL HYDROLYSIS PROCEDURE

A 10% suspension of soy isolate is prepared. (Alternatively, a 10% suspension of soy isolate containing 1.3g of calcium chloride per 100 g of soy isolate can be used). The suspension is autoclaved at 15 psi for 15 minutes. The pH is checked and adjusted to 6.5–7.0 when necessary. BPN-Ficin-Papin [Bovine Protease Novo-Ficin (protease derived from figs)-Papin (protease derived from papaya)] (1:1:1) is added at a one percent level (dry basis), and the material is hydrolyzed for two hours at 50° C. Hydrolysis is terminated by heating to 85° C with a steam coil. The material is centrifuged for 15 minutes at 12,000 rpm; the residue is washed with water. The combined hydrolysate and wash are adjusted to pH 4.0 with phosphoric acid, then chilled overnight in a refrigerator. The material is filtered, the filtrate flash concentrated, chilled overnight, and filtered again. The filtrate is freeze dried.

The protein hydrolysate is then admixed with L-aspartyl-L-phenylalanine methyl ester (APM) at the desired weight ratio (e.g. 4:1). The mixture is placed in aqueous solution until it is completely dissolved to form a clear solution. The solution is freeze-dried.

The pH of the mixture is 5.7 and the rate of solution is 12.5 times better than pure L-aspartyl-L-phenylalanine methyl ester. Moreover, no loss in sweetness intensity is discernible after the dry mixture is stored for 3 months at room temperature.

Where equal parts of soy isolate hydrolysate and egg albumen hydrolysate are employed in lieu of soy isolate alone, comparable solubility and stability results are obtained.

ALKALINE HYDROLYSIS PROCEDURE

A 5–10% protein suspension is prepared (optimum concentration depending on protein source), and the pH is adjusted to 8.75 with 50% sodium hydroxide solution. The material is heated to 95°–100° C with a steam coil and kept at that temperature for 15 minutes. The pH is then adjusted to 8 and the temperature to 50° C; this temperature is maintained throughout the hydrolysis. Alkaline from B. subtilis is added at a level representing 0.1 to 1% of the protein source (dry basis). The pH is monitored constantly, and when it reaches 7.0, 0.5% of BPN (Bovine Protease Novo) and 0.5% Papin (protease drived from papaya) are added. Hydrolysis is terminated 105 minutes after the addition of the first enzyme by heating to 85° C with a steam coil. The material is centrifuged and the residue is washed. The combined hydrolysate and wash are adjusted to pH 3.95 with phosphoric acid. When the hydrolysate is used in coffee, the pH is adjusted to 6.65. Celite is added at a concentration of 600 g per liter. The material is chilled in an ice bath for about 8 to 12 hours, then filtered through Whatman No. 40 paper precoated with 20 g of Celite per liter of hydrolysate. (The precoat should contain about 0.7g of Celite per square inch of surface). The filtrate is flash concentrated, then freeze dried.

The freeze dried hydrolysate is admixed with L-aspartyl-L-phenylalanine methyl ester (APM) at the desired weight ratio (4:1). The blend is placed in water and allowed to dissolve to form a clear solution. The solution is spray dried in a Niro Spray Dryer under conditions such that the temperature of the spray dried product does not exceed 100° C.

The same desirable results as those obtained where neutrally-hydrolyzed protein isolate was employed were obtained.

The following examples are presented for the purpose of further illustrating and explaining the present invention and are not to be taken as limiting in any sense. Unless otherwise indicated, all parts and percentages are by weight.

EXAMPLE I

Four 1 gm. mixtures of APM and soy isolate were dissolved in 10 ml. $H_2O$, all four systems having a pH of 4.7. The four systems contained the following parts APM protein hydrolysate respectively:

APM: SOY ISOLATE a. 5:95 Total concentration of APM = 0.5%
b. 10:90 Total concentration of APM = 1.0%
c. 15:85 Total concentration of APM = 1.5%
d. 20:80 Total concentration of APM = 2.0%

These four samples were evaluated against controls containing the same percent concentration APM but devoid of hydrolysate in order to evaluate whether the isolate had any affect on the flavor properties of APM.

In evaluating all eight samples, five benchtop tasters did not detect any loss in sweetness intensity of the APM when mixed with the hydrolysate.

EXAMPLE II

The following represents a broad ratio of systems tested in order to evaluate the effect protein hydrolysates have on the rate of solubility of APM.

All systems were prepared by dissolving the ingredients in water and freeze-drying. Evaluations were made in room temperature distilled water (10 ml) having a pH of 5.7 with constant stirring by a magnetic stirrer. The time was clocked from the instant the powder hit the water until complete dissolution.

Samples $A_1 - A_4$ consisted of 1 g. each in 10 ml; samples $B_1 - B_4$ (controls) consisted of the amount indicated, also in 10 ml., the total amount of APM in the controls being equivalent to the respective test samples ($A_1 - A_4$). Where applicable, the ratio expressed is of APM to soy isolate respectively.

| Sample | Content | Rate of Solubility |
|---|---|---|
| | (APM/Soy Isolate) | |
| $A_1$ | 50 mg/950 mg | 4 min. 10 seconds |
| $A_2$ | 100 mg/900 mg | 3 min. 45 seconds |
| $A_3$ | 150 mg/850 mg | 4 min. 30 seconds |
| $A_4$ | 200 mg/800 mg | 4 min. 50 seconds |
| | (APM alone) | |
| $B_1$ | 50 mgs. | 7 minutes |
| $B_2$ | 100 mgs. | 11 minutes |
| $B_3$ | 150 mgs. | Incomplete dissolution after 50 minutes |
| $B_4$ | 200 mgs. | Incomplete dissolution after 1 hour |

As is apparent, in all cases, the protein hydrolysate increased the rate of solubility of the sweetener, in some instances as much as 92% over the sweetener not having been co-dried with the hydrolysate.

EXAMPLE III

A convenient way of expressing the change in the solubility rate of a given amount of sweetener after combining with protein hydrolysate and dried is called the "Solubility Factor."

This is expressed as follows:

Solubility Factor (SF) =

$$\frac{\text{time needed for pure sweetener to dissolve}}{\text{time needed for sweetener/hydrolysate to dissolve}}$$

the higher the SF value, the more appreciable the improvement in solubility.

The SF of the sweetener/isolate samples of Examples II and III were calculated as follows:

| pH | System | APM Concentration (%) in Mixture | SF |
|---|---|---|---|
| 5.7 | $A_1$ | 5% | 1.7 |
| 5.7 | $A_2$ | 10% | 2.9 |
| 5.7 | $A_3$ | 15% | 11.11 |
| 5.7 | $A_4$ | 20% | 12.41 |

As is apparent, the SF generally increases as the ratio of sweetener to polypeptide decreases. Since one would expect the improvement in solubility to be greater in systems containing lesser amounts of the insoluble sweetener in relation to the amount of polypeptide present, the improvement in the solubility factor was indeed surprising suggesting that appreciable solubility improvements will be obtained commencing at about equimolar amounts polypeptide and sweetener, and approaching major and minor amounts of the respective components. This finding also allows greater concentrations of the originally poorly-soluble sweetener to be incorporated into virtually any system without the need for employing prohibitively large amounts of solubilizing agent.

Many modifications and variations of the present invention will become apparent to those skilled in the art upon reading the above specification. It is intended that all such modifications and variations be included within the scope of the present invention which is defined by the following claims:

We claim:

1. A method for improving the solubility and stability of dipeptide nutritive sweetners, while at the same time producing a bulked sweetening composition having a broader spectrum of amino acids which comprises co-drying an aqueous solution of at least one of said sweeteners with a nutritious, bland low molecular weight polypeptide, the sweetener and polypeptide being present in solution at from about equimolar amounts to weight ratios of sweetener to polypeptide of 1:100, which sweetener and polypeptide are present at concentrations at which both are soluble.

2. The method of claim 1 wherein the dipeptide is L-aspartyl-L-phenylalanine methyl ester.

3. The method of claim 1 wherein the low molecular weight polypeptide is an enzymatically hydrolyzed non-gelatin protein.

4. The method of claim 2 wherein the enzymatically hydrolyzed protein is vegetable derived.

5. The method of claim 3 wherein the vegetable derived hydrolyzed protein is soy isolate.

6. The method of claim 1 wherein co-drying is by freeze drying.

7. The method of claim 1 wherein co-drying is by spray drying.

8. The method of claim 1 wherein the ratio of sweetener to polypeptide is about 1:1 to about 1:20.

9. The method of claim 8 wherein the ratio of sweetener to polypeptide is about 1:4.

* * * * *